United States Patent
Yamamoto et al.

(10) Patent No.: US 9,153,841 B2
(45) Date of Patent: Oct. 6, 2015

(54) NON-AQUEOUS ELECTROLYTE SECONDARY BATTERY, AND NON-AQUEOUS ELECTROLYTE SOLUTION FOR NON-AQUEOUS ELECTROLYTE SECONDARY BATTERY

(75) Inventors: Hidekazu Yamamoto, Kobe (JP); Kouhei Tuduki, Kobe (JP); Taizou Sunano, Kobe (JP); Maruo Kamino, Katano (JP); Youichi Ohashi, Ibaraki (JP); Minoru Kotato, Ibaraki (JP)

(73) Assignees: SANYO Electric Co., Ltd., Daito-shi (JP); MITSUBISHI CHEMICAL CORPORATION, Tokyo (JP)

( * ) Notice: Subject to any disclaimer, the term of this patent is extended or adjusted under 35 U.S.C. 154(b) by 183 days.

(21) Appl. No.: 13/639,396

(22) PCT Filed: Apr. 28, 2011

(86) PCT No.: PCT/JP2011/060426
§ 371 (c)(1),
(2), (4) Date: Oct. 4, 2012

(87) PCT Pub. No.: WO2011/142276
PCT Pub. Date: Nov. 17, 2011

(65) Prior Publication Data
US 2013/0022879 A1    Jan. 24, 2013

(30) Foreign Application Priority Data
May 10, 2010    (JP) ................................ 2010-108225

(51) Int. Cl.
*H01M 6/16*    (2006.01)
*H01M 10/0567*    (2010.01)
(Continued)

(52) U.S. Cl.
CPC ...... *H01M 10/0567* (2013.01); *H01M 10/0525* (2013.01); *H01M 10/0569* (2013.01);
(Continued)

(58) Field of Classification Search
CPC    Y02E 60/122; H01M 4/1395; H01M 4/1393; H01M 4/134; H01M 4/133; H01M 4/386; H01M 4/587; H01M 10/052; H01M 10/0567
See application file for complete search history.

(56) References Cited

U.S. PATENT DOCUMENTS

2003/0068562 A1    4/2003    Kim et al.
2003/0190529 A1*  10/2003    Kim et al. ..................... 429/307
(Continued)

FOREIGN PATENT DOCUMENTS

CN    1755974 A    4/2006
EP    2 535 976 A1    12/2012
(Continued)

OTHER PUBLICATIONS

International Search Report of PCT/JP2011/060426; mailing date Jul. 26, 2011.
(Continued)

*Primary Examiner* — Ula C Ruddock
*Assistant Examiner* — Lisa S Park Gehrke
(74) *Attorney, Agent, or Firm* — Westerman, Hattori, Daniels & Adrian, LLP

(57) ABSTRACT

Provided is a nonaqueous electrolyte secondary battery which, even in the case of using a low-viscosity solvent having a narrow potential window, can increase the electrochemical stability of the nonaqueous electrolyte solution and suppress side reactions of the nonaqueous electrolyte solution during charge and discharge to reduce the degradation of the battery characteristics and has an excellent storage characteristic in high-temperature environments and a nonaqueous electrolyte solution for the nonaqueous electrolyte secondary battery. The nonaqueous electrolyte secondary battery includes: a positive electrode containing a positive-electrode active material; a negative electrode containing a negative-electrode active material; and a nonaqueous electrolyte solution containing a solute dissolved in a nonaqueous solvent, wherein the nonaqueous electrolyte solution further contains benzotrifluoride and a diisocyanate compound and the content of benzotrifluoride is 5% by volume or more in the nonaqueous electrolyte solution except the solute.

10 Claims, 1 Drawing Sheet

(51) Int. Cl.
  *H01M 10/0525* (2010.01)
  *H01M 10/0569* (2010.01)
  *H01M 4/1393* (2010.01)
  *H01M 4/133* (2010.01)
  *H01M 4/1395* (2010.01)
  *H01M 4/134* (2010.01)

(52) U.S. Cl.
  CPC ............... *H01M4/133* (2013.01); *H01M 4/134* (2013.01); *H01M 4/1393* (2013.01); *H01M 4/1395* (2013.01); *H01M 2300/0034* (2013.01); *Y02E 60/122* (2013.01)

(56) References Cited

U.S. PATENT DOCUMENTS

| | | |
|---|---|---|
| 2006/0073391 A1 | 4/2006 | Kim |
| 2008/0102375 A1 | 5/2008 | Shima |
| 2009/0061303 A1* | 3/2009 | Inagaki et al. ................. 429/163 |
| 2009/0226819 A1 | 9/2009 | Ihara et al. |
| 2009/0325065 A1 | 12/2009 | Fujii et al. |
| 2011/0091768 A1* | 4/2011 | Ohashi et al. ................. 429/199 |
| 2011/0151338 A1 | 6/2011 | Yamamoto et al. |

FOREIGN PATENT DOCUMENTS

| | | |
|---|---|---|
| JP | 10-112335 A | 4/1998 |
| JP | 2002-008719 A | 1/2002 |
| JP | 2000-106209 A | 4/2004 |
| JP | 2007-035616 A | 2/2007 |
| JP | 2007-242411 A | 9/2007 |
| JP | 2007-299543 A | 11/2007 |
| JP | 2009-245923 A | 10/2009 |
| WO | 2010/021236 A1 | 2/2010 |

OTHER PUBLICATIONS

Japanese Written Opinon of PCT/JP2011/060426; mailing date Jul. 26, 2011.

European Search Report dated Sep. 19, 2013, issued in European Patent Application No. 11780533.3.

Translation of the International Preliminary Report on Patentability (PCT/ISA/237) (5 pages), (PCT/IB/373) (1 page) of International Application No. PCT/JP2011/060426 mailed Dec. 20, 2012 (Form PCT/IB/338) (1 page).

Chinese Office Action dated Aug. 4, 2014, issued in corresponding CN application No. 201180021983.1 with English translation (17 pages).

* cited by examiner

NON-AQUEOUS ELECTROLYTE SECONDARY BATTERY, AND NON-AQUEOUS ELECTROLYTE SOLUTION FOR NON-AQUEOUS ELECTROLYTE SECONDARY BATTERY

TECHNICAL FIELD

This invention relates to nonaqueous electrolyte secondary batteries and nonaqueous electrolyte solutions for nonaqueous electrolyte secondary batteries.

BACKGROUND ART

Nonaqueous electrolyte secondary batteries for performing charge and discharge by using a nonaqueous electrolyte solution to transfer lithium ions between positive and negative electrodes are used as power sources for portable electronic devices, electric power storage, and others. In these nonaqueous electrolyte secondary batteries, graphite materials are widely used as the negative-electrode active material in the negative electrode.

Meanwhile, in recent years, size and weight reduction of mobile devices including cellular phones, notebook computers, and PDAs has rapidly progressed and the power consumption thereof has increased with increasing range of functions. Also for nonaqueous electrolyte secondary batteries used as power sources for the above mobile devices, there has been an increasing demand to reduce the weight and increase the capacity.

In order to increase the capacity of a nonaqueous electrolyte secondary battery, a technique is used in which a large amount of active material is packed into the battery to increase the packing density. In this case, however, the increase in packing density of the active material makes the electrolyte solution difficult to infiltrate into the entire region of the inside of the battery. Thus, the charge/discharge reaction will be nonuniform, which will easily cause local deterioration in the inside of the battery. Therefore, there is a need for an active material having a higher capacity than conventional materials. For the negative-electrode active material, a material having a higher capacity than graphite is being required.

For the above reason, studies have recently been conducted on the use of a material capable of alloying with lithium, such as silicon, germanium or tin, as the negative-electrode active material having a high capacity. With the use of such a material capable of alloying with lithium, the battery capacity can be increased but during alloying with lithium the volume of the negative-electrode active material is significantly increased by a charge reaction as compared with graphite materials and the like. At this time, the negative-electrode active material presses against the adjoining separator and positive-electrode active material layer, so that the electrolyte solution infiltrated in the inside of the electrode is squeezed out of the electrode assembly, resulting in decrease in the amount of electrolyte solution around the electrode. Thus, the charge/discharge reaction will be nonuniform, which will easily cause local deterioration in the inside of the battery.

In order to stabilize the battery characteristics, it is important to retain a state in which the electrolyte solution uniformly diffuses in the inside of the battery. Therefore, the electrolyte solution squeezed out of the electrode assembly needs to be infiltrated into the inside of the electrode assembly again. To this end, it is effective to reduce the viscosity of the electrolyte solution.

Generally, an electrolyte solution is composed of a solute and a solvent for dissolving the solute. Chain carbonates are used as common solvents and the content of chain carbonate in the electrolyte solution is relatively high. Therefore, if the viscosity of the chain carbonate is reduced, the viscosity of the electrolyte solution can also be reduced. For example, if diethyl carbonate commonly used is replaced with a chain carbonate having a small carbon number in the side chain, such as methyl ethyl carbonate or dimethyl carbonate, the viscosity can be reduced.

Alternatively, the use of a carboxylic acid ester or a ketone exhibiting a lower viscosity than chain carbonates can further reduce the viscosity of the electrolyte solution.

However, low-viscosity chain carbonates, carboxylic acid esters, and ketone shave relatively narrow potential windows owing to their small molecular weights and high reactivity. Thus, the nonaqueous electrolyte solution will be electrochemically unstable, will easily cause side reactions with the active material, and tends to degrade the battery characteristics. With the use of materials capable of alloying with lithium, such as silicon, as the negative-electrode active material, these materials easily react particularly with the electrolyte solution, which presents a problem in that the battery characteristics will be more significantly degraded.

In addition, when the battery is stored in a charged state in a high-temperature environment, the reaction of the above material with the electrolyte solution will be particularly significant and the attendant gassing and like present some problems, such as increase in thickness of the electrode.

Patent Literature 1 discloses that the addition of a small amount of fluorobenzene, cyclohexylbenzene or cyclohexylfluorobenzene to the electrolyte solution enables suppression of the reaction of the negative-electrode active material, such as silicon, with the nonaqueous electrolyte solution. However, there is a demand to further suppress the reaction with the electrolyte solution and further enhance the charge-discharge cycle characteristic.

The present invention employs a nonaqueous electrolyte solution containing benzotrifluoride and a diisocyanate compound as will be described later.

Patent Literature 2 discloses a nonaqueous electrolyte secondary battery in which an electrolyte solution containing a diisocyanate compound is used. However, the literature does not disclose any effect that would be caused if the diisocyanate compound were used together with benzotrifluoride.

CITATION LIST

Patent Literature

Patent Literature 1: JP-A 2007-299543
Patent Literature 2: JP-A 2007-242411

SUMMARY OF INVENTION

Technical Problem

The present invention is intended to provide a nonaqueous electrolyte secondary battery which, even in the case of using a low-viscosity solvent having a narrow potential window, can increase the electrochemical stability of the nonaqueous electrolyte solution and suppress side reactions of the nonaqueous electrolyte solution during charge and discharge to reduce the degradation of the battery characteristics and has an excellent storage characteristic in high-temperature environments and a nonaqueous electrolyte solution for the nonaqueous electrolyte secondary battery.

Solution to Problem

A nonaqueous electrolyte secondary battery of the present invention is directed to a nonaqueous electrolyte secondary battery including: a positive electrode containing a positive-electrode active material; a negative electrode containing a negative-electrode active material; and a nonaqueous electrolyte solution containing a solute dissolved in a nonaqueous solvent, wherein the nonaqueous electrolyte solution further contains benzotrifluoride and a diisocyanate compound and the content of benzotrifluoride is 5% by volume or more in the nonaqueous electrolyte solution except the solute.

It is believed that in the present invention, the diisocyanate compound contained in the nonaqueous electrolyte solution reacts with and binds to hydroxyl groups existing on the surface of the negative-electrode active material and a coating formed by the reaction can suppress side reactions occurring between the negative electrode and the electrolyte solution to reduce the degradation of the battery characteristics. It is also believed that in the present invention, benzotrifluoride contained in the nonaqueous electrolyte solution interacts with the diisocyanate compound to form a denser coating. The formation of this dense coating is believed to allow, even in the case of using a low-viscosity solvent having a narrow potential window, the electrochemical stability of the nonaqueous electrolyte solution to be increased to enhance the battery characteristics and improve the high-temperature storage characteristics.

In the present invention, the content of benzotrifluoride is preferably within the range of 5% to 50% by volume and more preferably within the range of 10% to 40% by volume in the nonaqueous electrolyte solution except the solute. Within the above content range, the charge-discharge cycle characteristic can be increased and the storage characteristic in high-temperature environments can also be increased.

Diisocyanate compounds that can be used in the present invention include various diisocyanate compounds but alkylene diisocyanate compounds are particularly preferably used.

The carbon number of the aliphatic hydrocarbon group in the alkylene diisocyanate compound is preferably 4 to 12 and more preferably 6 to 12. Specific examples of these alkylene diisocyanate compounds include 1,6-diisocyanatohexane, 1,7-diisocyanatoheptane, 1,8-diisocyanatooctane, 1,9-diisocyanatononane, 1,10-diisocyanatodecane, 1,11-diisocyanatoundecane, and 1,12-diisocyanatododecane.

In the present invention, the content of the diisocyanate compound is, in the nonaqueous electrolyte solution except the solute, preferably within the range of 0.01% by volume to 10% by volume, more preferably within the range of 0.1% by volume to 5% by volume, and particularly preferably within the range of 0.5% by volume to 4% by volume. If the content of the diisocyanate compound is too low, this may result in failure to form an adequate coating on the negative-electrode active material. On the other hand, if the content of the diisocyanate compound is too high, this may increase the resistance inside the battery to reduce the battery capacity.

In the present invention, chain carbonates like diethyl carbonate, methyl ethyl carbonate, and dimethyl carbonate can be used as the nonaqueous solvent. Also usable are carboxylic acid esters, ketones and like low-viscosity solvents having a narrower potential window than chain carbonates.

Examples of the carboxylic acid esters include methyl acetate, ethyl acetate, propyl acetate, methyl propionate, ethyl propionate, propyl propionate, methyl butyrate, ethyl butyrate, and propyl butyrate. Examples of the ketones include acetone, ethyl methyl ketone, diethyl ketone, methyl propyl ketone, ethyl propyl ketone, and dipropyl ketone.

Furthermore, at least part of hydrogen in the chain carbonate, the carboxylic acid ester or the ketone may be substituted with fluorine.

When the nonaqueous electrolyte solution contains a low-viscosity solvent having a narrow potential window, the content of the solvent is, in the nonaqueous electrolyte solution except the solute, preferably within the range of 50% by volume to 95% by volume, more preferably within the range of 60% by volume to 90% by volume, and particularly preferably within the range of 70% by volume to 85% by volume. If the content of the solvent is too low, this may result in failure to reduce the viscosity of the nonaqueous electrolyte solution to sufficiently improve the battery characteristics including the charge-discharge cycle characteristic. On the other hand, if the content is too high, this may degrade the conductivity of the electrolyte solution.

In the present invention, the electrolyte solution preferably contains a cyclic carbonate as the nonaqueous solvent. Specific examples of the cyclic carbonate include ethylene carbonate, propylene carbonate, and butylene carbonate. Part of the cyclic carbonate is more preferably fluorinated. Specific examples of the fluorinated cyclic carbonate include fluorinated cyclic carbonate derivatives, such as 4-fluoro-1,3-dioxolan-2-one, 4,5-difluoro-1,3-dioxolan-2-one, 4,4-difluoro-1,3-dioxolan-2-one, 4-fluoro-5-methyl-1,3-dioxolan-2-one, 4-fluoro-4-methyl-1,3-dioxolan-2-one, and 4-trifluoromethyl-1,3-dioxolan-2-one.

The fluorinated cyclic carbonates preferably used are 4-fluoro-1,3-dioxolan-2-one and 4,5-difluoro-1,3-dioxolan-2-one, and 4-fluoro1,3-dioxolan-2-one is particularly preferably used. The use of these fluorinated cyclic carbonates further enhances the charge-discharge cycle characteristic.

The content of the fluorinated cyclic carbonate in the nonaqueous electrolyte solution is preferably within the range of 5% by volume to 50% by volume, more preferably within the range of 10% by volume to 40% by volume, and particularly preferably within the range of 10% by volume to 20% by volume. If the content of the fluorinated cyclic carbonate is too low, this may degrade the cycle characteristic. On the other hand, if the content of the fluorinated cyclic carbonate is too high, this may increase the gassing caused by storage at high temperatures.

The nonaqueous solvent in the present invention is not limited to one composed only of the above low-viscosity solvent having a narrow potential window and the above fluorinated cyclic carbonate, and the electrolyte solution may further contain one or more other chain carbonates and one or more other cyclic carbonates as nonaqueous solvents.

Negative-electrode active materials that can be used in the present invention include those commonly used in nonaqueous electrolyte secondary batteries and example of usable negative-electrode active materials include carbon materials, such as graphite, and materials capable of alloying with lithium, such as silicon, germanium, and tin. Of these, particularly preferably used is a negative-electrode active material containing silicon. With the use of the negative-electrode active material containing silicon, a high-capacity battery can be formed.

Also when a carbon material, such as graphite, is used as the negative-electrode active material, the effects of the present invention, or enhancement in cycle characteristic and improvement in charge storage characteristic, can be provided.

For example, the negative-electrode active material containing silicon is powdered silicon and/or a silicon alloy.

Examples of the silicon alloy used for the negative-electrode active material include solid solutions of silicon and one or more other elements, intermetallics of silicon and one or more other elements, and eutectic alloys of silicon and one or more other elements.

Known methods can be used as the method for producing such a silicon alloy, and examples of the method that can be used include arc melting, liquid quenching, mechanical alloying, sputtering, chemical vapor deposition, and firing. Examples of liquid quenching that can be used include single-roller quenching, twin-roller quenching, and various atomization processes, such as gas atomization, water atomization, and disk atomization.

The negative electrode in the present invention is preferably a negative electrode in which a negative-electrode mixture layer composed of a negative-electrode active material made of powdered silicon and/or a silicon alloy and a binder is provided on a negative-electrode current collector. Furthermore, the negative electrode is preferably formed so that after the negative-electrode mixture layer composed of the negative-electrode active material and the binder is provided on the negative-electrode current collector, the negative-electrode mixture layer is sintered at a temperature equal to or above the glass transition temperature of the binder in a non-oxidizing atmosphere. By the sintering at a temperature equal to or above the glass transition temperature of the binder, the adhesion in the negative-electrode active material and the adhesion between the negative-electrode active material and the negative-electrode current collector can be increased. In order to increase the adhesion in the negative-electrode active material and the adhesion between the negative-electrode active material and the negative-electrode current collector and prevent shedding of the negative-electrode active material from the negative-electrode current collector due to expansion and contraction of the negative-electrode active material during charge and discharge, it is preferred that after the negative-electrode mixture layer is provided on the negative-electrode current collector, the mixture layer should be rolled and then sintered.

The binder preferably used is a polyimide resin. The use of the polyimide resin allows the negative electrode to be sintered at a temperature equal to or above the glass transition temperature of the binder, which can increase the adhesion in the negative-electrode active material and the adhesion between the negative-electrode active material and the negative-electrode current collector to suppress the deterioration of the negative-electrode active material composed of powdered silicon and/or a silicon alloy due to expansion thereof during charge and discharge.

The temperature for sintering the negative electrode is preferably a temperature equal to or above the glass transition temperature of the binder as described above, and preferably within the range of 200° C. to 500° C. in the case of using the polyimide resin.

The non-oxidizing atmosphere is preferably an atmosphere of inert gas, such as argon, or a nitrogen gas atmosphere. The atmosphere may be a reducing atmosphere, such as hydrogen gas.

The negative-electrode current collector preferably used is one having a surface roughness Ra of 0.2 μm or more. With the use of the negative-electrode current collector having a surface roughness Ra of 0.2 μm or more, the contact area between the negative-electrode active material and the negative-electrode current collector is increased and the binder enters between asperities on the surfaces of the negative-electrode current collector. Sintering in this condition even develops the anchoring effect to significantly enhance the adhesion between the negative-electrode active material and the negative-electrode current collector and thereby further suppress shedding of the negative-electrode active material from the negative-electrode current collector due to expansion and contraction of the negative-electrode active material during charge and discharge.

In the nonaqueous electrolyte secondary battery of the present invention, known positive-electrode active materials commonly used can be used as the positive-electrode active material for use in the positive electrode. Examples of usable materials include lithium-containing transition metal oxides, including lithium-cobalt composite oxides, such as $LiCoO_2$, lithium-nickel composite oxides, such as $LiNiO_2$, lithium-manganese composite oxides, such as $LiMn_2O4$ and $LiMnO_2$, lithium-nickel-cobalt composite oxides, such as $LiNi_{1-x}Co_xO_2$ (0<x<1), lithium-manganese-cobalt composite oxides, such as $LiMn_{1-x}Co_xO_2$ (0<x<1), lithium-nickel-cobalt-manganese composite oxides, such as $LiNi_xCo_yMn_zO_2$ (x+y+z=1), and lithium-nickel-cobalt-aluminum composite oxides, such as $LiNi_xCo_yAl_zO_2$ (x+y+z=1).

In the case of using lithium cobaltate $LiCoO_2$ as the positive-electrode active material, it is desirable to bond zirconium to the surface thereof. This stabilizes the crystal structure of lithium cobaltate to increase the charge-discharge cycle characteristic and suppresses the occurrence of side reactions other than the charge/discharge reaction at the interface with the nonaqueous electrolyte solution.

In the present invention, usable solutes to be dissolved in the nonaqueous solvent include lithium salts commonly used in nonaqueous electrolyte secondary batteries. Examples of such lithium salts that can be used include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures of them. The solute preferably contains not only such a lithium salt but also a lithium salt having an oxalate complex as anions. Examples of usable lithium salts having an oxalate complex as anions include lithium bis(oxalate)borate.

The content of the solute in the nonaqueous electrolyte solution is, but not limited to, generally preferably within the range of 0.5 mol/liter to 2 mol/liter, more preferably within the range of 0.6 mol/liter to 1.8 mol/liter, and particularly preferably within the range of 0.7 mol/liter to 1.7 mol/liter.

A nonaqueous electrolyte solution of the present invention is a nonaqueous electrolyte solution for a nonaqueous electrolyte secondary battery containing a nonaqueous solvent and a solute dissolved in the nonaqueous solvent, wherein the nonaqueous electrolyte solution further contains benzotrifluoride and a diisocyanate compound. The content of benzotrifluoride is 5% by volume or more in the nonaqueous electrolyte solution except the solute.

With the use of the nonaqueous electrolyte solution of the present invention, a nonaqueous electrolyte secondary battery can be provided which, even in the case of using a low-viscosity solvent having a narrow potential window, can increase the electrochemical stability of the nonaqueous electrolyte solution and suppress side reactions of the nonaqueous electrolyte solution during charge and discharge to reduce the degradation of the battery characteristics and has an excellent storage characteristic in high-temperature environments.

Advantageous Effects of Invention

The present invention can provide, even in the case of using a low-viscosity solvent having a narrow potential window, a nonaqueous electrolyte secondary battery which can increase the electrochemical stability of the nonaqueous electrolyte solution and suppress side reactions of the nonaqueous electrolyte solution during charge and discharge to reduce the degradation of the battery characteristics and has an excellent storage characteristic in high-temperature environments.

DESCRIPTION OF EMBODIMENTS

Figure 1:
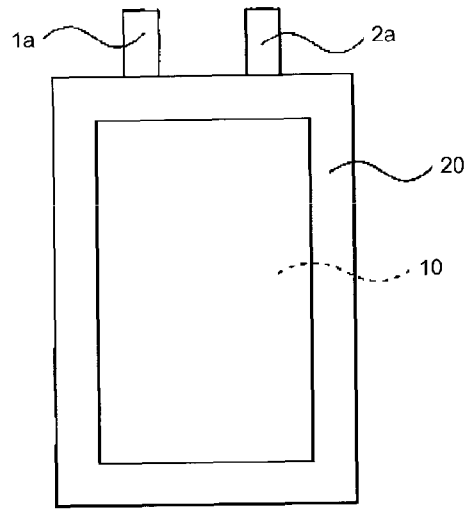
FIG. 1 is a plan view showing a nonaqueous electrolyte secondary battery produced in an example of the present invention.

Hereinafter, the present invention will be described with reference to specific examples. However, the present invention is not at all limited by the following examples and can be embodied in various other forms appropriately modified without changing the spirit of the invention.

<Experiment 1>

EXAMPLE 1

[Production of Positive Electrode]

A positive-electrode active material was used in which a zirconium compound was bonded to the surface of lithium cobaltate (average particle diameter: 13 μm, BET specific surface area: 0.35 $m^2/g$) represented by $LiCoO_2$. Lithium cobaltate having a zirconium compound bonded to the surface thereof can be produced by adding the zirconium compound into the source material and firing the mixture.

The above positive-electrode active material, carbon material powder as an electronic conductor, and poly(vinylidene fluoride) as a binder were weighed in a mass ratio of 95:2.5:2.5, followed by addition of an N-methyl-2-pyrrolidone solution and kneading, resulting in preparation of a positive-electrode mixture slurry.

Next, using a positive-electrode current collector formed of a 15 μm thick, 402 mm long and 50 mm wide piece of aluminum foil, the above positive-electrode mixture slurry was applied to the positive-electrode current collector with a length of 340 mm and a width of 50 mm on one side and with a length of 271 mm and a width of 50 mm on the opposite side. This current collector was dried and rolled to produce a positive electrode. Here, the thickness of the positive electrode was 143 μm, the amount of positive electrode mixture on the positive-electrode current collector was 48 $mg/cm^2$, and the packing density of the positive electrode mixture was 3.75 $g/cm^3$.

Then, a positive-electrode current collector tab formed of a 70 μm thick, 35 mm long and 4 mm wide aluminum flat plate was attached to a portion of the positive electrode on which the positive electrode mixture was not applied.

[Production of Negative Electrode]

Silicon powder (purity: 99.9% by mass) having an average particle diameter of 10 μm was used as a negative-electrode active material.

The above negative-electrode active material, graphite powder as an electronic conductor, and a thermoplastic polyimide having a glass transition temperature of 295° C. and serving as a binder were weighed in a mass ratio of 87:3:7.5, followed by addition of an N-methyl-2-pyrrolidone solution and kneading, resulting in preparation of a negative-electrode mixture slurry.

Then, the above negative-electrode mixture slurry was applied to both sides of a negative-electrode current collector formed of a 20 μm thick piece of Cu—Ni—Si—Mg (Ni: 3% by mass, Si: 0.65% by mass, Mg: 0.15% by mass) alloy foil having a surface roughness Ra of 0.3 μm and dried. The amount of negative electrode mixture on the negative-electrode current collector was 5.6 $mg/cm^2$.

Next, the negative-electrode current collector provided with the negative electrode mixture in the above manner was cut out in a rectangular shape 380 mm long by 52 mm wide, and the cut piece was rolled and sintered by a heat treatment in an argon atmosphere at 400° C. for 10 hours to produce a negative electrode. The thickness of the negative electrode after being sintered was 56 μm.

Then, a negative-electrode current collector tab formed of a 70 μm thick, 35 mm long and 4 mm wide nickel flat plate was attached to an end of the negative electrode.

[Preparation of Nonaqueous Electrolyte Solution]

A mixture solvent was prepared in which 4-fluoro-1,3-dioxolan-2-one (fluoroethylene carbonate: FEC). dimethyl carbonate (DMC), benzotrifluoride ($CF_3Ph$), and 1,6-diisocyanatohexane (HMDI) were mixed to give a volume ratio of 20:69:10:1. $LiPF_6$ was dissolved as a solute in the above mixture solvent to give a concentration of 1.0 mol/liter and carbon dioxide gas was dissolved to 0.4% by mass in the mixture to prepare a nonaqueous electrolyte solution.

[Production of Nonaqueous Electrolyte Secondary Battery]

A nonaqueous electrolyte secondary battery was produced using the positive electrode, negative electrode, and nonaqueous electrolyte solution which were prepared as above. The positive electrode and the negative electrode were opposed with a separator interposed therebetween and these components were wound up together while being bent at predetermined positions and then pressed down to produce an electrode assembly in a flattened shape.

Figure 2:
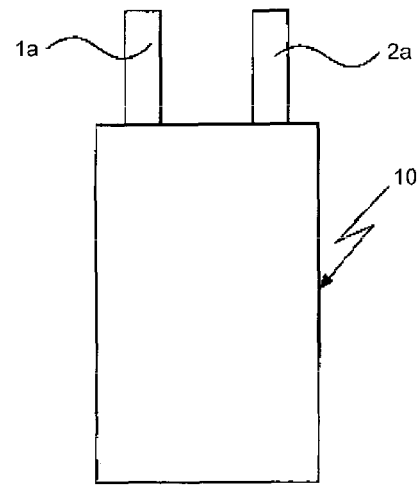
FIG. 2 is a plan view showing an electrode assembly produced in the example of the present invention.
Figure 3:
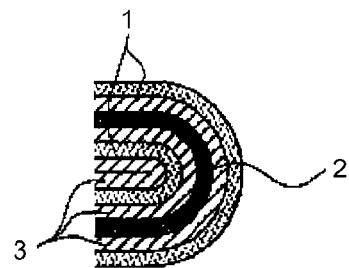
FIG. 3 is a partially cross-sectional view showing the electrode assembly produced in the example of the present invention.

FIG. 2 shows an electrode assembly 10 thus produced and FIG. 3 is a partially cross-sectional view of the electrode assembly 10. As shown in FIG. 3, a separator 3 is interposed between the positive electrode 1 and the negative electrode 2 and these components are wound up together. The separator 3 used comprises two sheets of separator made of polyethylene porous material having a thickness of 22 μm, a length of 430 mm, and a width of 54.5 mm.

As shown in FIG. 2, the electrode assembly 10 was produced so that a positive-electrode current collector tab 1a connected to the positive electrode 1 and a negative-electrode current collector tab 2b connected to the negative electrode 2 could protrude from the electrode assembly 10.

FIG. 1 is a plan view showing a nonaqueous electrolyte secondary battery produced using the electrode assembly shown in FIG. 2. As shown in FIG. 1, the electrode assembly 10 was put in a battery housing 20 made of aluminum laminate film, the above nonaqueous electrolyte solution was poured into the battery housing 20, and the opening of the battery housing 20 was sealed with the positive-electrode current collector tab 1a and the negative-electrode current collector tab 2a pulled to the outside to produce a nonaqueous electrolyte secondary battery. The design capacity of the produced nonaqueous electrolyte secondary battery was 950 mAh.

EXAMPLE 2

A nonaqueous electrolyte secondary battery was produced in the same manner as in Example 1 except that the volume ratio of FEC:DMC:$CF_3$Ph:HMDI was changed to 20:49:30:1.

EXAMPLE 3

A nonaqueous electrolyte secondary battery was produced in the same manner as in Example 2 except that 1,12-diisocyanatododecane (DMDI) was used in place of HMDI.

COMPARATIVE EXAMPLE 1

A nonaqueous electrolyte secondary battery was produced in the same manner as in Example 1 except that $CF_3$Ph and HMDI were not used and the volume ratio of FEC:DMC was 20:80.

COMPARATIVE EXAMPLE 2

A nonaqueous electrolyte secondary battery was produced in the same manner as in Example 1 except that HMDI was not used and the volume ratio of FEC:DMC:$CF_3$Ph was 20:70:10.

COMPARATIVE EXAMPLE 3

A nonaqueous electrolyte secondary battery was produced in the same manner as in Example 1 except that HMDI was not used and the volume ratio of FEC:DMC:$CF_3$Ph was 20:50:30.

COMPARATIVE EXAMPLE 4

A nonaqueous electrolyte secondary battery was produced in the same manner as in Example 1 except that HMDI was not used and the volume ratio of FEC:DMC:$CF_3$Ph was 20:30:50.

COMPARATIVE EXAMPLE 5

A nonaqueous electrolyte secondary battery was produced in the same manner as in Example 1 except that $CF_3$Ph was not used and the volume ratio of FEC:DMC:HMDI was 20:79:1.

COMPARATIVE EXAMPLE 6

A nonaqueous electrolyte secondary battery was produced in the same manner as in Example 1 except that the volume ratio of FEC:DMC:$CF_3$Ph:HMDI was 20:77:2:1.

COMPARATIVE EXAMPLE 7

A nonaqueous electrolyte secondary battery was produced in the same manner as in Example 1 except that pentafluorobenzene (PFB) was used in place of $CF_3$Ph and the volume ratio of FEC:DMC:PFB:HMDI was 20:69:10:1.

COMPARATIVE EXAMPLE 8

A nonaqueous electrolyte secondary battery was produced in the same manner as in Example 1 except that hexyl isocyanate was used in place of HMDI and the volume ratio of FEC:DMC:$CF_3$Ph:hexyl isocyanate was 20:49:30:1.

EXAMPLE 4

A nonaqueous electrolyte secondary battery was produced in the same manner as in Example 1 except that methyl propionate (MP) was used in place of DMC and the volume ratio of FEC:MP:$CF_3$Ph:HMDI was 20:49:30:1.

EXAMPLE 5

A nonaqueous electrolyte secondary battery was produced in the same manner as in Example 4 except that DMDI was used in place of HMDI and the volume ratio of FEC:MP:$CF_3$Ph:DMDI was 20:49:30:1.

COMPARATIVE EXAMPLE 9

A nonaqueous electrolyte secondary battery was produced in the same manner as in Example 4 except that $CF_3$Ph and HMDI were not used and the volume ratio of FEC:MP was 20:80.

[Evaluation of Nonaqueous Electrolyte Secondary Battery]

<Discharge Load Characteristic>

Under a room temperature condition of 25° C., each of the nonaqueous electrolyte secondary batteries of Examples 1 to 5 and Comparative Examples 1 to 9 was charged at a constant current of 190 mA to 4.2 V, further charged at a constant voltage of 4.2 V to a current value of 48 mA, and then discharged at a constant current of 190 mA to 2.75 V. Thereafter, each nonaqueous electrolyte secondary battery was charged at a constant current of 950 mA to 4.2 V, further charged at a constant voltage of 4.2 V to a current value of 48 mA, and then discharged at a constant current of 950 mA to 2.75 V. In this manner, an initial charge and discharge operation was performed. From results of this initial charge and discharge test, the discharge load characteristic was calculated by the equation below.

Discharge load characteristic={(discharge capacity at 950 mA)/(discharge capacity at 180 mA)}×100

<Cycle Characteristic>

Next, under a temperature condition of 45° C., each of the nonaqueous electrolyte secondary batteries of Examples 1 to 5 and Comparative Examples 1 to 9 initially charged and discharged in the above manner was charged at a constant current of 950 mA to 4.2 V, further charged at a constant voltage of 4.2 V to a current value of 48 mA, and then discharged at a constant current of 950 mA to 2.75 V. This charge and discharge operation was taken as one cycle and repeated 250 cycles.

For each of the nonaqueous electrolyte secondary batteries of Examples 1 to 5 and Comparative Examples 1 to 9, the first cycle discharge capacity Q1 and the 250th cycle discharge capacity Q250 were determined and the capacity retention at the 250th cycle under a temperature condition of 45° C. was calculated by the equation below.

Capacity retention=(Q250/Q1)×100

<Charge Storage Characteristic>

Furthermore, under a temperature condition of 25° C., each of the nonaqueous electrolyte secondary batteries of Examples 1 to 5 and Comparative Examples 1 to 9 initially charged and discharged in the above manner was charged at a constant current of 950 mA to 4.2 V and further charged at a constant voltage of 4.2 V to a current value of 48 mA. Each battery was measured for thickness in this state and then stored in an environment of 60° C. for 20 days.

Then, each of the nonaqueous electrolyte secondary batteries of Examples 1 to 5 and Comparative Examples 1 to 9 was measured for battery thickness after storage for 20 days to calculate the amount of increase in battery thickness during 20 days storage at 60° C.

Amount of increase in battery thickness=(battery thickness after storage)−(battery thickness before storage)

Here, the increase in battery thickness can be understood to be a phenomenon caused by the fact that a gas component generated by the reaction inside the battery expands the laminate and, in other words, the battery thickness in this case can be considered as an amount of gas generated during the storage test.

Table 1 shows evaluation results of each of the batteries of Examples and Comparative Examples, together with the composition of the electrolyte solution.

TABLE 1

| | Composition of Electrolyte Solution (% by volume) | | | | | | | | Cycle Characteristic Capacity | Charge Storage Characteristic Amount of Thickness | Discharge Load Characteristic |
|---|---|---|---|---|---|---|---|---|---|---|---|
| | FEC | DMC | MP | CF3Ph | PFB | HMDI | DMDI | Hexyl Isocyanate | Retention (%) | Increase (mm) | 1.0 C/0.2 C (%) |
| Ex. 1 | 20 | 69 | — | 10 | — | 1 | — | — | 49 | 10 | 95 |
| Ex. 2 | 20 | 49 | — | 30 | — | 1 | — | — | 58 | 7 | 95 |
| Ex. 3 | 20 | 49 | — | 30 | — | — | 1 | — | 59 | 6 | 95 |
| Comp. Ex. 1 | 20 | 80 | — | — | — | — | — | — | 36 | 14 | 95 |
| Comp. Ex. 2 | 20 | 70 | — | 10 | — | — | — | — | 40 | 13 | 95 |
| Comp. Ex. 3 | 20 | 50 | — | 30 | — | — | — | — | 47 | 11 | 95 |
| Comp. Ex. 4 | 20 | 30 | — | 50 | — | — | — | — | 43 | 11 | 95 |
| Comp. Ex. 5 | 20 | 79 | — | — | — | 1 | — | — | 43 | 13 | 95 |
| Comp. Ex. 6 | 20 | 77 | — | 2 | — | 1 | — | — | 43 | 13 | 95 |
| Comp. Ex. 7 | 20 | 69 | — | — | 10 | 1 | — | — | 40 | 11 | 95 |
| Comp. Ex. 8 | 20 | 49 | — | 30 | — | — | — | 1 | 43 | 13 | 95 |
| Ex. 4 | 20 | — | 49 | 30 | — | 1 | — | — | 59 | 6 | 96 |
| Ex. 5 | 20 | — | 49 | 30 | — | — | 1 | — | 59 | 5 | 96 |
| Comp. Ex. 9 | 20 | — | 80 | — | — | — | — | — | 28 | 20 | 96 |

As shown in Table 1, in relation to the composition of the electrolyte solution containing dimethyl carbonate, Examples 1 to 3 in which a nonaqueous electrolyte solution containing benzotrifluoride and a diisocyanate compound was used exhibits good results in terms of cycle characteristic and charge storage characteristic at high temperature as compared with Comparative Examples 1 to 8.

Comparing Example 2 in which HMDI was added, Example 3 in which DMDI was added, and Comparative Example 8 in which hexyl isocyanate as a monoisocyanate was added, Examples 2 and 3 exhibit better results in terms of all of cycle characteristic, charge storage characteristic, and discharge load characteristic than Comparative Example 8.

In relation to the composition of the electrolyte solution in which methyl propionate was used, Examples 4 and 5 in which a nonaqueous electrolyte solution containing benzotrifluoride and a diisocyanate compound was used exhibit good results in terms of cycle characteristic and charge storage characteristic at high temperature as compared with Comparative Example 9.

In comparison among Examples 1, 2, and 4 in which the same amount of HMDI was added and comparison between Examples 3 and 5 in which the same amount of DMDI was added, the nonaqueous electrolyte secondary batteries of Examples 4 and 5 in which methyl propionate was used have more excellent charge storage characteristic and discharge load characteristic than the others in either case. Therefore, it is preferred to use methyl propionate rather than dimethyl carbonate.

Comparative Examples 2 to 4 further containing only benzotrifluoride and Comparative Example 5 further containing only a diisocyanate compound slightly improved the cycle characteristic as compared with Comparative Example 1 further containing neither benzotrifluoride nor diisocyanate compound. In contrast, Examples 1 to 3 further containing both of benzotrifluoride and a diisocyanate compound significantly improved the cycle characteristic and charge storage characteristic as compared with Comparative Example 2 further containing only benzotrifluoride and Comparative Example 5 further containing only a diisocyanate compound. This reveals that the effects of the present invention are attributed to synergy between benzotrifluoride and a diisocyanate compound.

Specifically, HDMI, a kind of diisocyanate compound, forms a coating on the surface of the negative-electrode active material. This coating is believed to be densified by the effect of benzotrifluoride. It is believed that such a dense coating can suppress side reactions caused during charge and discharge, such as decomposition of the electrolyte solution, to thereby significantly improve the charge/discharge cycle characteristic and charge storage characteristic.

A comparison between Comparative Example 6 containing 2% by volume benzotrifluoride and Example 1 containing 10% by volume benzotrifluoride reveals that the content of benzotrifluoride is preferably 5% by volume or more and more preferably 10% by volume or more.

Furthermore, comparing Example 1 in which benzotrifluoride was used with Comparative Example 7 in which pentafluorobenzene was used, this shows that the effects of the present invention cannot be exerted by pentafluorobenzene.

As can be seen, the present invention can reduce the degradation of the battery characteristics and improve the storage characteristic in high-temperature environments, even in the case of using a low-density solvent having a narrow potential window, such as DMC or MP.

By following the present invention, a low-viscosity solvent, such as DMC or MP, can be used with high electrochemical stability, which allows, in the case of using an electrode active material, such as silicon, which will cause large volumetric expansion and contraction due to charge and discharge, the electrolyte solution squeezed out of the electrode assembly to be smoothly infiltrated into the inside of the electrode again. This prevents the inside of the battery from being locally deteriorated owing to nonuniform charge/discharge reaction, resulting in provision of excellent battery characteristics.

<Experiment 2>

Here, experiments were conducted by changing the content of HMDI as a diisocyanate compound and experiments were also conducted by changing the content of FEC as a fluorinated cyclic carbonate.

EXAMPLE 6

A nonaqueous electrolyte secondary battery was produced in the same manner as in Example 1 except that the volume ratio of FEC:DMC:CF$_3$Ph:HMDI was changed to 20:49.5:30:0.5.

EXAMPLE 7

A nonaqueous electrolyte secondary battery was produced in the same manner as in Example 1 except that the volume ratio of FEC:DMC:CF$_3$Ph:HMDI was changed to 20:46:30:4.

EXAMPLE 8

A nonaqueous electrolyte secondary battery was produced in the same manner as in Example 1 except that 4,5-difluoro-1,3-dioxolan-2-one (difluoroethylene carbonate: DFEC) was used as a solvent and the volume ratio of FEC:DFEC:DMC:CF$_3$Ph:HMDI was changed to 19:1:49:30:1.

EXAMPLE 9

A nonaqueous electrolyte secondary battery was produced in the same manner as in Example 1 except that ethylene carbonate (EC) was used as a solvent and the volume ratio of FEC:EC:DMC:CF$_3$Ph:HMDI was changed to 10:10:49:30:1.

EXAMPLE 10

A nonaqueous electrolyte secondary battery was produced in the same manner as in Example 1 except that propylene carbonate (PC) was used as a solvent and the volume ratio of FEC:PC:DMC:CF$_3$Ph:HMDI was changed to 15:5:49:30:1.

EXAMPLE 11

A nonaqueous electrolyte secondary battery was produced in the same manner as in Example 1 except that EC, PC, and methyl propionate (MP) were used as solvents, DMDI was used as the diisocyanate compound, and the volume ratio of FEC:EC:PC:DMC:MP:CF$_3$Ph:DMDI was changed to 15:2.5:2.5:34:15:30:1.

[Evaluation of Nonaqueous Electrolyte Secondary Battery]

Examples 6 to 11 were evaluated for cycle characteristic, charge storage characteristic, and discharge load characteristic in the same manner as in Experiment 1. The evaluation results are shown in Table 2.

TABLE 2

| | Composition of Electrolyte Solution (% by volume) | | | | | | | | Cycle Characteristic Capacity Retention (%) | Charge Storage Characteristic Amount of Thickness Increase (mm) | Discharge Load Characteristic 1.0 C/0.2 C (%) |
|---|---|---|---|---|---|---|---|---|---|---|---|
| | FEC | DFEC | EC | PC | DMC | MP | CF$_3$Ph | HMDI | DMDI | | | |
| Ex. 6 | 20 | — | — | — | 49.5 | — | 30 | 0.5 | — | 55 | 9 | 95 |
| Ex. 7 | 20 | — | — | — | 46 | — | 30 | 4 | — | 56 | 6 | 95 |
| Ex. 8 | 19 | 1 | — | — | 49 | — | 30 | 1 | — | 59 | 9 | 95 |
| Ex. 9 | 10 | — | 10 | — | 49 | — | 30 | 1 | — | 58 | 5 | 95 |
| Ex. 10 | 15 | — | — | 5 | 49 | — | 30 | 1 | — | 57 | 6 | 95 |
| Ex. 11 | 15 | — | 2.5 | 2.5 | 34 | 15 | 30 | — | 1 | 58 | 7 | 95 |

As is obvious from the results shown in Table 2, Example 6 in which the content of HMDI as a diisocyanate compound was 0.5% by volume and Example 7 in which the content of HMDI was 4% by volume also exhibit good results on cycle characteristic, charge storage characteristic, and discharge load characteristic.

Furthermore, Examples 8 to 10 in which part of FEC as a fluorinated cyclic carbonate was replaced with DFEC, EC or PC and Example 11 in which part of FEC was substituted with EC or PC and DMC was substituted with MP also exhibit good results on cycle characteristic, charge storage characteristic, and discharge load characteristic.

<Experiment 3>

Here, experiments were conducted in which a carbon material was used as the negative-electrode active material.

EXAMPLE 12

[Production of Negative Electrode]

Artificial graphite having an average particle diameter of 20 μm as a negative-electrode active material and styrene-butadiene rubber as a binder were mixed into an aqueous solution containing carboxymethyl cellulose as a thickener dissolved in water serving as a dispersion medium so that the weight ratio of active material to binder to thickener was 97.5:1:1.5, resulting in preparation of a negative electrode slurry. The prepared slurry was applied onto both sides of a 9 μm thick, 317 mm long and 52 mm wide piece of electrolytic copper foil serving as a negative-electrode current collector so that a portion thereof applied to the front side of the current collector was 284 mm long and 52 mm wide and a portion thereof applied to the back side of the current collector was 226 mm long and 52 mm wide, and the slurry was dried and then rolled. The amount of active material layer on the current collector and the thickness of the negative electrode were 19.3 mg/cm$^2$ and 130 μm, respectively, in the portion of the current collector in which a pair of active material layers were formed on both sides.

[Production of Positive Electrode]

Using a positive-electrode current collector formed of a 15 μm thick, 339 mm long and 50 mm wide piece of aluminum foil, a positive-electrode mixture slurry made of the same material as in Example 1 was applied onto the positive-electrode current collector with a length of 277 mm and a width of 50 mm on one side and with a length of 208 mm and a width of 50 mm on the opposite side, and this current collector was dried and rolled to produce a positive electrode. Here, the thickness of the positive electrode was 148 μm, the amount of positive electrode mixture on the positive-electrode current collector was 49.8 mg/cm$^2$, and the packing density of the positive electrode mixture was 3.75 g/cm$^3$.

Then, a positive-electrode current collector tab formed of a 70 μm thick, 35 mm long and 4 mm wide aluminum flat plate was attached to a portion of the positive electrode on which the positive electrode mixture was not applied.

[Production of Nonaqueous Electrolyte Secondary Battery]

A battery was produced in the same manner as in Example 1 and put in a battery housing 20 made of aluminum laminate film. The electrolyte solution used was the same kind of electrolyte solution as in Example 3. The design capacity of the produced battery was 830 mAh.

EXAMPLE 13

A nonaqueous electrolyte secondary battery was produced in the same manner as in Example 12 except that the volume ratio of FEC:EC:DMC:CF$_3$Ph:HMDI was changed to 10:10:49:30:1.

EXAMPLE 14

A nonaqueous electrolyte secondary battery was produced in the same manner as in Example 12 except that the volume ratio of FEC:MP:CF$_3$Ph:HMDI was changed to 20:49:30:1.

EXAMPLE 15

A nonaqueous electrolyte secondary battery was produced in the same manner as in Example 12 except that the volume ratio of FEC:EC:PC:DMC:CF$_3$Ph:HMDI was changed to 10:5:5:49:30:1.

EXAMPLE 16

A nonaqueous electrolyte secondary battery was produced in the same manner as in Example 12 except that the volume ratio of FEC:PC:DMC:CF$_3$Ph:HMDI was changed to 15:5:49:30:1.

EXAMPLE 17

A nonaqueous electrolyte secondary battery was produced in the same manner as in Example 12 except that the volume ratio of FEC:MP:CF$_3$Ph:DMDI was changed to 20:49:30:1.

COMPARATIVE EXAMPLE 10

A nonaqueous electrolyte secondary battery was produced in the same manner as in Example 12 except that the volume ratio of FEC:DMC was changed to 20:80.

COMPARATIVE EXAMPLE 11

A nonaqueous electrolyte secondary battery was produced in the same manner as in Example 12 except that the volume ratio of FEC:DMC:HMDI was changed to 20:79:1.

COMPARATIVE EXAMPLE 12

A nonaqueous electrolyte secondary battery was produced in the same manner as in Example 12 except that the volume ratio of FEC:DMC:CF$_3$Ph was changed to 20:50:30.

COMPARATIVE EXAMPLE 13

A nonaqueous electrolyte secondary battery was produced in the same manner as in Example 12 except that the volume ratio of FEC:MP was changed to 20:80.

<Discharge Load Characteristic>

Under a room temperature condition of 25° C., each of the nonaqueous electrolyte secondary batteries of Examples 12 to 17 and Comparative Examples 10 to 13 was charged at a constant current of 166 mA to 4.2 V, further charged at a constant voltage of 4.2 V to a current value of 41 mA, and then discharged at a constant current of 166 mA to 2.75 V. Thereafter, each nonaqueous electrolyte secondary battery was charged at a constant current of 830 mA to 4.2 V, further charged at a constant voltage of 4.2 V to a current value of 41 mA, and then discharged at a constant current of 830 mA to 2.75 V. In this manner, an initial charge and discharge operation was performed. From results of this initial charge and discharge test, the discharge load characteristic was calculated by the following equation:

$$\text{Discharge load characteristic} = \{(\text{discharge capacity at } 830 \text{ mA})/(\text{discharge capacity at } 166 \text{ mA})\} \times 100.$$

<Cycle Characteristic>

Next, under a temperature condition of 45° C., each of the nonaqueous electrolyte secondary batteries of Examples 12 to 17 and Comparative Examples 10 to 13 initially charged and discharged in the above manner was charged at a constant current of 830 mA to 4.2 V, further charged at a constant voltage of 4.2 V to a current value of 41 mA, and then discharged at a constant current of 830 mA to 2.75 V. This charge and discharge operation was taken as one cycle and repeated 250 cycles. For each of the nonaqueous electrolyte secondary batteries of Examples 12 to 17 and Comparative Examples 10 to 13, the first cycle discharge capacity Q1 and the 250th cycle discharge capacity Q250 were determined and the capacity retention at the 250th cycle under a temperature condition of 45° C. was calculated by the following equation:

$$\text{Capacity retention} = (Q250/Q1) \times 100.$$

<Charge Storage Characteristic>

Furthermore, under a temperature condition of 25° C., each of the nonaqueous electrolyte secondary batteries of Examples 12 to 17 and Comparative Examples 10 to 13 initially charged and discharged in the above manner was charged at a constant current of 830 mA to 4.2 V and further charged at a constant voltage of 4.2 V to a current value of 41 mA. Each battery was measured for thickness in this state and then stored in an environment of 60° C. for 20 days. Then, each of the nonaqueous electrolyte secondary batteries of Examples 12 to 17 and Comparative Examples 10 to 13 was measured for battery thickness after storage for 20 days to calculate the amount of increase in battery thickness during 20 days storage at 60° C.:

Amount of increase in battery thickness=(battery thickness after storage)-(battery thickness before storage).

Here, the increase in battery thickness can be understood to be a phenomenon caused by the fact that a gas component generated by the reaction inside the battery expands the laminate and, in other words, the battery thickness in this case can be considered as an amount of gas generated during the storage test. Table 3 shows evaluation results of each of the batteries of Examples and Comparative Examples, together with the composition of the electrolyte solution.

TABLE 3

| | Composition of Electrolyte Solution (% by volume) | | | | | | | Cycle Characteristic Capacity Retention (%) | Charge Storage Characteristic Amount of Thickness Increase (mm) | Discharge Load Characteristic 1.0 C/0.2 C (%) |
|---|---|---|---|---|---|---|---|---|---|---|
| | FEC | EC | PC | DMC | MP | CF$_3$Ph | HMDI | DMDI | | | |
| Ex. 12 | 20 | — | — | 49 | — | 30 | 1 | — | 87 | 6 | 97 |
| Ex. 13 | 10 | 10 | — | 49 | — | 30 | 1 | — | 86 | 4 | 97 |
| Ex. 14 | 20 | — | — | — | 49 | 30 | 1 | — | 83 | 6 | 97 |
| Ex. 15 | 10 | 5 | 5 | 49 | — | 30 | 1 | — | 85 | 4 | 97 |
| Ex. 16 | 15 | — | 5 | 49 | — | 30 | 1 | — | 85 | 6 | 97 |
| Ex. 17 | 20 | — | — | — | 49 | 30 | — | 1 | 84 | 5 | 97 |
| Comp. Ex. 10 | 20 | — | — | 80 | — | — | — | — | 79 | 14 | 97 |
| Comp. Ex. 11 | 20 | — | — | 79 | — | — | 1 | — | 78 | 10 | 97 |
| Comp. Ex. 12 | 20 | — | — | 50 | — | 30 | — | — | 79 | 12 | 97 |
| Comp. Ex. 13 | 20 | — | — | — | 80 | — | — | — | 75 | 18 | 97 |

As is obvious from the results shown in Table 3, also in the case of using graphite as the negative-electrode active material, the use of benzotrifluoride and a diisocyanate compound can increase the cycle characteristic and the charge storage characteristic.

As can be seen, the effects of the present invention can be provided also in the case of using a carbon material, such as graphite, as the negative-electrode active material.

REFERENCE SIGNS LIST

1 ... positive electrode
1a ... positive-electrode current collector tab
2 ... negative electrode
2a ... negative-electrode current collector tab
3 ... separator
10 ... electrode assembly
20 ... battery housing

The invention claimed is:

1. A nonaqueous electrolyte secondary battery including: a positive electrode containing a positive-electrode active material; a negative electrode containing a negative-electrode active material; and a nonaqueous electrolyte solution containing a solute dissolved in a nonaqueous solvent, wherein the nonaqueous electrolyte solution further contains benzotrifluoride and an alkylene diisocyanate compound and the content of benzotrifluoride is 5% by volume or more in the nonaqueous electrolyte solution except the solute and
the negative-electrode active material contains silicon.

2. The nonaqueous electrolyte secondary battery according to claim 1, wherein the content of benzotrifluoride is 10% by volume or more in the nonaqueous electrolyte solution except the solute.

3. The nonaqueous electrolyte secondary battery according to claim 1, wherein the content of the alkylene diisocyanate compound is within the range of 0.5% to 4.0% by volume in the nonaqueous electrolyte solution except the solute.

4. The nonaqueous electrolyte secondary battery according to claim 1, wherein dimethyl carbonate, methyl ethyl carbonate, a carboxylic acid ester or a ketone is contained as the nonaqueous solvent.

5. The nonaqueous electrolyte secondary battery according to claim 1, wherein the carbon number of the aliphatic hydrocarbon group in the alkylene diisocyanate compound is 4 to 12.

6. A nonaqueous electrolyte secondary battery including: a positive electrode containing a positive-electrode active material; a negative electrode containing a negative-electrode active material; and a nonaqueous electrolyte solution containing a solute dissolved in a nonaqueous solvent, wherein
the nonaqueous electrolyte solution further contains benzotrifluoride and an alkylene diisocyanate compound and the content of benzotrifluoride is 5% by volume or more in the nonaqueous electrolyte solution except the solute and
the negative-electrode active material contains a graphite material.

7. The nonaqueous electrolyte secondary battery according to claim 6, wherein the content of benzotrifluoride is 10% by volume or more in the nonaqueous electrolyte solution except the solute.

8. The nonaqueous electrolyte secondary battery according to claim 6, wherein the content of the alkylene diisocyanate compound is within the range of 0.5% to 4.0% by volume in the nonaqueous electrolyte solution except the solute.

9. The nonaqueous electrolyte secondary battery according to claim 6, wherein dimethyl carbonate, methyl ethyl carbonate, a carboxylic acid ester or a ketone is contained as the nonaqueous solvent.

10. The nonaqueous electrolyte secondary battery according to claim 6, wherein the carbon number of the aliphatic hydrocarbon group in the alkylene diisocyanate compound is 4 to 12.

* * * * *